US011338852B2

(12) United States Patent
Stabel et al.

(10) Patent No.: US 11,338,852 B2
(45) Date of Patent: May 24, 2022

(54) VEHICLE-TRAILER BACKING SYSTEM WITH JACKNIFE PROTECTION

(71) Applicant: Continental Automotive Systems, Inc., Auburn Hills, MI (US)

(72) Inventors: Ryan Stabel, Grand Blanc, MI (US); Alejandro Salcido Zarco, Tlajomulco de Zúñiga (MX); Ali Houry, Dearborn, MI (US); Arturo Holt, Commerce, MI (US); Berenice Sanvicente Herrera, Tlajomulco de Zuniga (MX); Diego German Canedo Texon, Zapopan (MX); Francisco Alejandro Fuentes Perez, Tonalá (MX); Joseph Zagroba, Auburn Hills, MI (US); Julien Biton, Lake Orion, MI (US); Marco Antonio Ramírez Frías, Guadalajara (MX)

(73) Assignee: Continental Autonomous Mobility US, LLC, Auburn Hills, MI (US)

(*) Notice: Subject to any disclaimer, the term of this patent is extended or adjusted under 35 U.S.C. 154(b) by 49 days.

(21) Appl. No.: 16/110,960

(22) Filed: Aug. 23, 2018

(65) Prior Publication Data
US 2019/0061816 A1 Feb. 28, 2019

Related U.S. Application Data

(60) Provisional application No. 62/548,999, filed on Aug. 23, 2017.

(51) Int. Cl.
*B62D 13/06* (2006.01)
*B62D 15/02* (2006.01)
(Continued)

(52) U.S. Cl.
CPC ............ *B62D 13/06* (2013.01); *B60D 1/245* (2013.01); *B60D 1/62* (2013.01); *B62D 6/003* (2013.01);
(Continued)

(58) Field of Classification Search
CPC ...... B62D 13/06; B62D 6/003; B62D 15/025; B62D 15/0285; B62D 53/0871; B60D 1/245; B60D 1/62
See application file for complete search history.

(56) References Cited

U.S. PATENT DOCUMENTS

2014/0049723 A1  2/2014 Ryu et al.
2014/0067207 A1* 3/2014 Noh ..................... G08G 1/168
701/41

(Continued)

FOREIGN PATENT DOCUMENTS

EP   3287744 A1   2/2018
WO  2015001066 A2   1/2015
WO  2016171022 A1  10/2016

OTHER PUBLICATIONS

International Search Report and Written Opinion dated Nov. 11, 2018 from corresponding International Patent Application No. PCT/US2018/047798.
(Continued)

Primary Examiner — Sze-Hon Kong

(57) ABSTRACT

A method of maneuvering a vehicle-trailer assembly in reverse travel with a backing system includes: initiating a backing mode for the backing system; determining a current relative position representing a relative angle between the vehicle and the trailer; retrieving an operator proficiency setting selected by an operator; determining a maximum allowable relevant position for the current trailer based on the selected operator proficiency setting and the current trailer calibration data; receiving a position adjustment
(Continued)

request via an input device; determining a new relative position request based upon the position adjustment request and the selected operator proficiency setting; comparing the new relative position request to the maximum allowed relative position setting to determine if the new relative position is below the maximum allowed relative position setting; setting a new relative position to the new relative position request when the new relative position request is within the maximum allowed relative position setting.

23 Claims, 6 Drawing Sheets

(51) Int. Cl.
 B62D 6/00 (2006.01)
 B62D 53/08 (2006.01)
 B60D 1/62 (2006.01)
 B60D 1/24 (2006.01)
(52) U.S. Cl.
 CPC ....... B62D 15/025 (2013.01); B62D 15/0285 (2013.01); B62D 53/0871 (2013.01)

(56) References Cited

U.S. PATENT DOCUMENTS

| | | | |
|---|---|---|---|
| 2014/0277941 A1 | 9/2014 | Chiu et al. | |
| 2015/0217693 A1* | 8/2015 | Pliefke | B62D 13/06 |
| | | | 348/118 |
| 2015/0344067 A1* | 12/2015 | Lavoie | B62D 15/027 |
| | | | 701/41 |
| 2015/0367886 A1 | 12/2015 | Lavoie et al. | |
| 2016/0059888 A1 | 3/2016 | Bradley et al. | |
| 2016/0059889 A1 | 3/2016 | Herzog et al. | |
| 2017/0050672 A1* | 2/2017 | Gieseke | B62D 13/06 |
| 2017/0158233 A1 | 6/2017 | Herzog et al. | |
| 2018/0362026 A1* | 12/2018 | Heimberger | B60R 1/00 |
| 2020/0086793 A1* | 3/2020 | Watanabe | G08G 1/16 |
| 2020/0148063 A1* | 5/2020 | Dastoor | B60L 3/102 |

OTHER PUBLICATIONS

File history of U.S. Appl. No. 15/361,614 including the final Office Action dated Jul. 6, 2018 and the non-final Office Action dated Dec. 28, 2017.

* cited by examiner

VEHICLE-TRAILER BACKING SYSTEM WITH JACKNIFE PROTECTION

TECHNICAL FIELD

The present disclosure relates to automotive vehicles and more particularly to advance operator assistance systems for automotive vehicles.

BACKGROUND

A trailer is typically connected to a towing vehicle through a trailer hitch. The trailer hitch allows the trailer to swivel around the hitch horizontally so that the vehicle and trailer assembly is able to move around corners. This, however, can pose difficulties when the vehicle is traveling in reverse. When the vehicle backs up, it pushes the trailer. In certain situations, it is important that the trailer moves straight ahead or along an intended path. Operators are often confused as to which way to turn the vehicle steering wheel to get the desired change of direction of the trailer. Applying an incorrect steering angle in the vehicle may also cause the trailer to jack-knife and lose its course.

Therefore, backing of trailers attached to vehicles often requires multiple persons to effectively control the vehicle and direct the path the vehicle and trailer are required to travel. Additionally, those unaccustomed to operating vehicle and trailer systems may have some difficulty in accurately controlling the path of the trailer while backing the vehicle and trailer.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of maneuvering a vehicle and a trailer assembly in reverse travel with a backing system including: initiating a backing mode for the backing system. The method also includes determining a current relative position representing a relative angle between the vehicle and the trailer with an electronic control unit. The method also includes retrieving an operator proficiency setting of the backing system selected by an operator. The method also includes determining a maximum allowable relevant position setting for the current trailer based on the selected operator proficiency setting and the current trailer calibration data. The method also includes receiving a position adjustment request via an input device. The method also includes determining a new relative position request based upon the position adjustment request to the input device and the selected operator proficiency setting. The method also includes comparing the new relative position request to the maximum allowed relative position setting for the selected operator proficiency setting to determine if the new relative position is below the maximum allowed relative position setting. The method also includes setting a new relative position to the new relative position request when the new relative position request is within the maximum allowed relative position setting. The method also includes sending a request to a steering system to provide a steering control for the new relative position.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
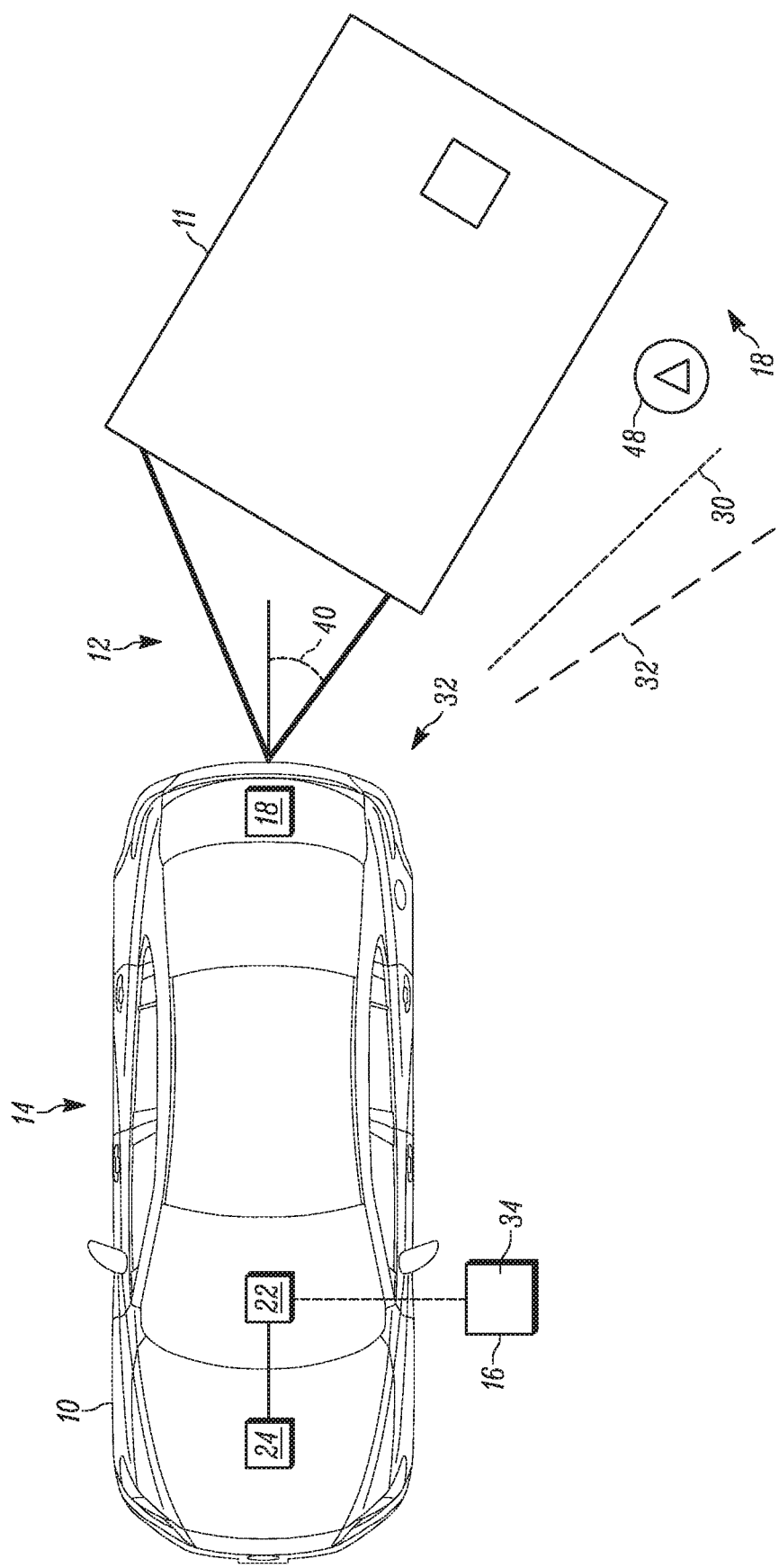
FIG. 1 is a schematic diagram of a vehicle and trailer assembly having a trailer backing system of the present invention.

The following description is merely exemplary in nature and is in no way intended to limit the disclosure, its application, or uses. For purposes of clarity, the same reference numbers will be used in the drawings to identify similar elements. FIG. 1 illustrates a vehicle 10 and a trailer 11 (not shown in FIGS. 2-3). The vehicle 10 may be a car, truck, tractor, etc. The trailer 11 is controllably secured to the vehicle 10 to form a vehicle and trailer assembly 12. The vehicle and trailer assembly 12 utilizes a trailer backing system 14 of the present invention. Throughout the application the relative directions of forward and rear are used in the traditional manner. That is, in reference to the direction which an operator for the vehicle 10 would typically be facing when driving the vehicle 10. Therefore, in operation of the trailer backing system 14 the vehicle 10 would be in a reverse gear and the vehicle and trailer assembly 12 are moving backward. During use of the backing system 14, the operator of the backing system 14 may also be facing "backward" in the same direction the vehicle-trailer assembly 12 is moving.

Figure 2:
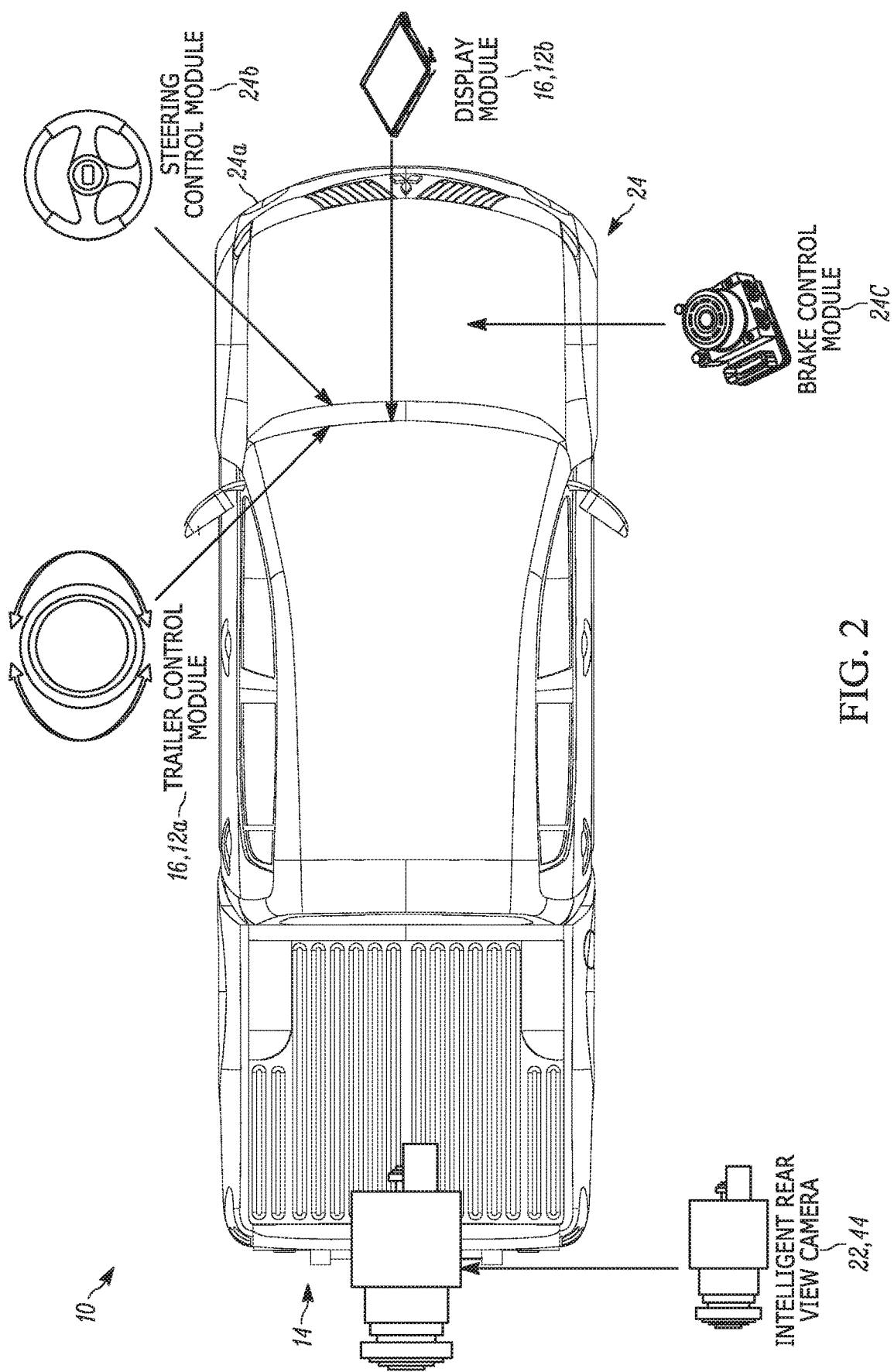
FIG. 2 is a first embodiment of the backing system on a vehicle.

Referring to FIGS. 1-2, a first embodiment for utilizing the trailer backing system 14 is described. An input device 16 is connected to allow a user to input instructions to an electronic control unit (ECU) 22 for the trailer backing system 14. The input device 16 acts as a human machine interface (HMI) between the operator and the backing system 14 and may include multiple components, such as an input device 16a and a display 16b. The input device 16a may be incorporated into the vehicle as a separate control from the steering wheel, e.g. shown here as a knob style control. Further inputs into the system may be entered through the HMI devices for the vehicle.

The ECU 22 may be connected to various vehicle systems 24 such as a powertrain system 24a, a steering system 24b, a brake system 24c, etc. to control and direct movement of the vehicle and trailer assembly 12. The ECU 22 sends instructions to the vehicle systems 24 to move the vehicle and trailer assembly 12 along a desired backing path to a final location based upon user inputs.

The ECU 22 receives a variety of inputs from the input device 16 to control the vehicle and trailer assembly 12 with the backing system 14. The ECU 22 interprets the various inputs, and determines the desired vehicle action that the input 26 is requesting. Based upon a current status of the vehicle and trailer assembly 12, and the desired vehicle action the ECU 22 determines a required vehicle response needed to achieve the desired vehicle action, and sends the appropriate signal(s) to instruct the various vehicle systems 24 to perform the calculated vehicle response. The backing system 14 can incorporate the variety of input requests to provide complete user control of the vehicle and trailer assembly 12 from outside the vehicle 10. In particular, the backing system 14 uses a relative position 40, e.g. a hitch angle, between the vehicle 10 and the trailer 11 to determine the correction vehicle-trailer position and to determine the vehicle response needed to achieve the desired vehicle action, i.e. the change in relative position that is needed.

The backing system 14 may use camera(s) 18 on the vehicle 10 to provide a rear view of the vehicle 10, camera 18 viewing angle show in phantom. The camera 18 is preferably a camera which is already installed in the vehicle 10, such as a back-up camera or a surround view camera. The camera 18 captures an image and image analysis by the ECU 22 is used to calculate the measured relative position 40. The measured relative position 40 is used by the ECU 22 to determine a desired steering angle based on the requested relative position 40, e.g. hitch angle. The current relative position 40 may also be displayed on the device 16 as well for user information.

The ECU 22 can use image analysis to pick out a plurality of reference features 45, e.g. corners of the trailer 11, decal or symbols on the trailer 11 or trailer hitch, etc. The ECU 22 may then also learn a plurality of relative distances 47 between these features to calculate the trailer geometry and store the reference features 45 in memory accessible by the ECU 22 as a specific trailer 11.

In addition, to the plurality of relative distances 47 of reference features 45 the backing system 14 will also need to know a plurality of relative distances 47 which are associated with the geometry of the trailer 11. The backing system 14 can learn some trailer geometry in the learning mode. Knowing the relative distances 47 of the reference features 45 and knowing the trailer geometry the ECU 22 can calculate the relative position 40 between the vehicle and/or tractor 10 and trailer 11 and track in changes in the relative position 40 in real time. The ECU 22 must know the vehicle 10 and trailer 11 geometry including the vehicle wheelbase (by), the distance from the rear axle to the hitch point on the vehicle h, the length of the trailer (c), hitch point to first axle on trailer (a), the height from the ground to the hitch point (g) and some of the geometry of the front of the trailer, i.e. these are some of the plurality of reference features 45 and relative distances 47.

Further extension is possible to self-learn the trailer 11 geometry and length based on prior movements of the trailer 11 in forward and/or possible backwards motion. Each trailer 11 has a certain way of control largely depending on the length of the trailer 11. Monitoring the movement of the trailer 11 while the vehicle and trailer assembly 12 is in motion makes it possible to self-learn the trailer 11 geometry and begin tracking the trailer relative position 40 in real time It is important to note that self-learning requires input of the vehicle dynamics and video(s) feed from the camera(s) 18. Trailer length can also be determined with blind spot radars/lidars. These distances may be learned by the operator performing several preset maneuvers with the vehicle and trailer assembly. The ECU 22 takes measurements during the calibration maneuvers and therefore the necessary trailer geometry is calculated and stored in the ECU 22 for the backing system 14.

Figure 3:
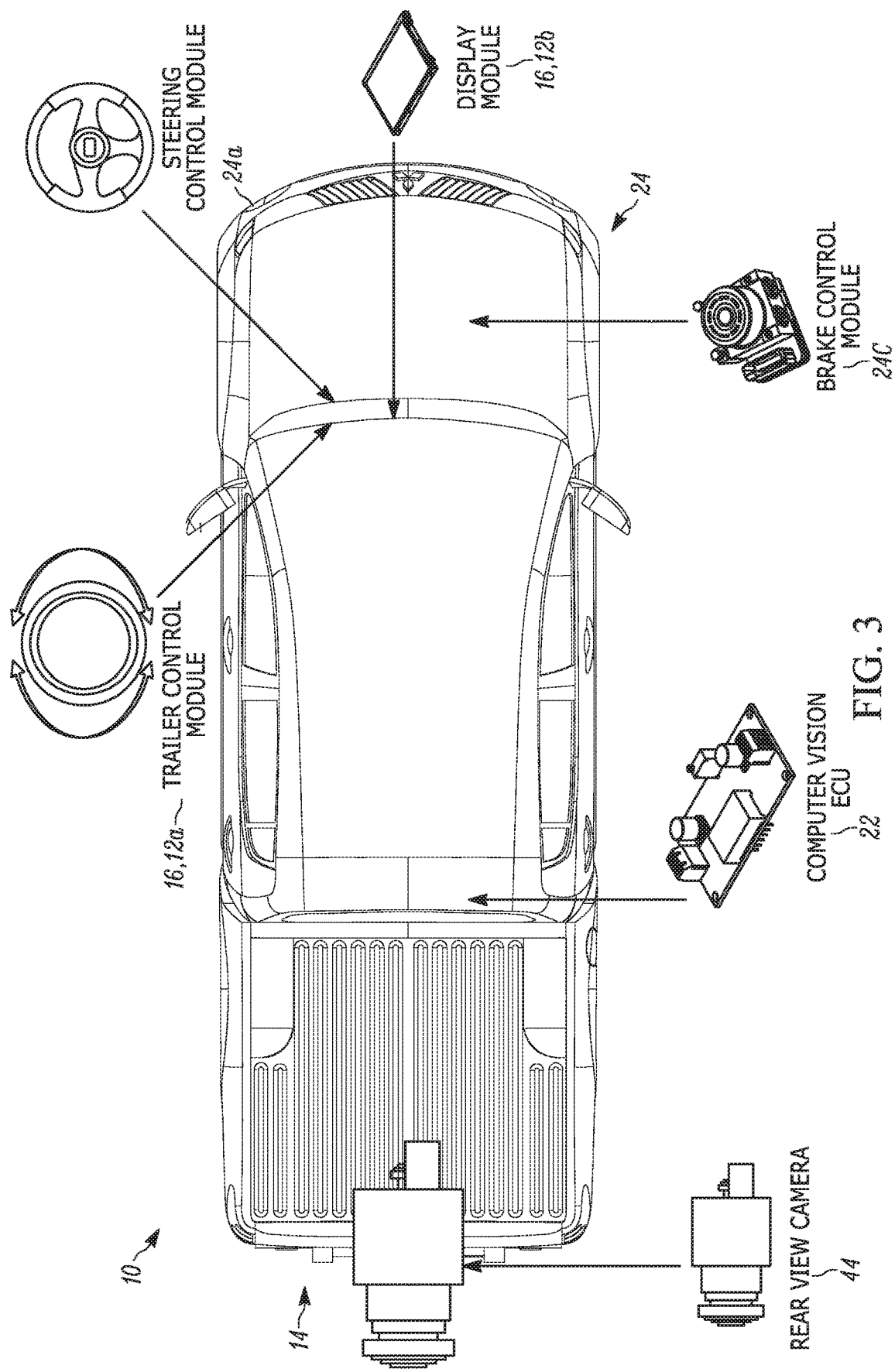
FIG. 3 is a second embodiment of the backing system on a vehicle

Once a trailer calibration has been performed the backing system 14 will remember the trailer 11 and the calibration maneuvers may not need to be performed again. The operator may simply select the trailer from the stored memory using the vehicle HMI. For example as shown in FIGS. 2 and 3, the operator may use the infotainment/navigation system inputs and display or other input available on the instrument cluster for the vehicle 10. Additionally, the input device may have various other inputs available, e.g. buttons, push down on knob, etc. or be able to control a selector for the HMI when not being used to input the desired steering angle during the reversing process.

Alternatively, the ECU 22 may automatically recognize a previously stored trailer by comparing the plurality of current reference features 45 and the plurality of current relative distances 47 in a current image, with the plurality of stored reference features 45 and the plurality of stored relative distances 47. The plurality of current reference features 45 and the plurality of current relative distances 47 which can be viewed by the camera 18 will change as the vehicle and trailer assembly 12 are moving and the relative position between the vehicle 10 and trailer 11 changes. Therefore, the number of stored reference features and the stored relative distances in stored calibration may be greater than the number of current reference features 45 and current relative distances 47 being viewed by the camera.

Additionally, for a new trailer the initial current reference features 45 and the plurality of current relative distances 47 will be limited to what can be initially seen. Once in learning mode additional current reference features 45 and the plurality of current relative distances 47 of a new trailer 11 will come in to view as the relative position between the vehicle 10 and the trailer 11 are calculated in real time. Also, some of the trailer geometry information will be determined during the learning mode. Therefore, the number current reference features 45 and current relative distances 47 of a new trailer will be less than what is determined in learning mode which becomes part of the stored calibration. The stored calibration is recorded in storage accessible by the ECU 22 and the trailer 11 will now be a stored trailer 11.

Once maximum trailers are stored and a new one is detected then the trailer not used in the longest amount of time gets deleted and the new one replaces. This may be automatic or the operator may be able to confirm the suggestion to delete the trailer entry that has not been used in the longest amount of time. Alternatively, the operator may be given the option of which trailer to delete.

The operator may be able to visualize and/or customize the list with names is desired. However, no user interaction is required to learn the trailer 11, unless the calibration maneuvers were not performed prior to trying to use the backing system 14.

Referring to FIG. 3, at least one camera 18 may be an intelligent camera 18, in that an ECU 22 is incorporated in the housing with the camera 18.

Referring to FIGS. 1-3, the ECU 22 receives control signals from the input device 16 based on movement of the input device 16 to the right and left and interprets the movement to begin a steering request in the direction chosen. Anti-jack knife measures will limit the maximum relative position to either side. The trailer 11 has an available range of motion 30. Within the available range of motion 30 is a limited available motion 30 (only one side shown). When the input device 16 is in the preset available range of motion 30 the backing system 14 limits the maximum relative position of the vehicle and trailer assembly 12 backing up to prevent jack-knifing. The range of motion 30, could be, e.g., 25-35% of an available maximum range of motion 32. This feature is particularly important for individuals who are unfamiliar with backing trailers 11, when inadvertent jack-knifing of the trailer 11 may occur.

However, situations may occur when range of motion greater than the allowed range of motion 30 is desired and the anti-jack knife measures can be overridden. For example, an experienced user may desire a relative position 40 to avoid an obstacle 48 (as shown in FIG. 1), where the desired relative position 40 is outside the allowed range of motion 30. In such instances, a maximum range of motion 32 of the input device, as shown between the dotted lines, may be implemented. The user may override the preset available range of motion 30 to allow the maximum range of motion 32 by, e.g., pressing downward while simultaneously moving the input device 16 further in the desired direction 36. Of course, in other embodiments, instead of pressing downward, the input device may be moved in some other direction, e.g., left, right, upward, etc.

The ECU 22 receives control signals to allow the relative position 40 to move to a full extent of the range of motion available, when the input device 16 is moved past the allowed range of motion 30 and into the maximum range of motion 32. The movement of the input device 16 would still have the same rate of requested change, e.g., turning the input device 5 degrees would still request a 5% increase in relative position, but would now allow the requested relative position to extend through a greater range of motion.

A method of controlling the vehicle and trailer assembly 12 with the backing system 14 would include the ECU 22 determining a position of the input device 16 relative to the allowed range of motion 30 of the input device 16, and requesting a relative position based on the position of the input device 16, where in the allowed range of motion 30 limits the relative position to a first maximum value, and moving a input device 16 to a maximum range of motion 32 to request a new relative position, wherein the new relative position is a second maximum value. The second maximum value is the maximum relative position available for a vehicle and trailer assembly 12. The backing system 14, wherein moving the input device to the maximum range of motion includes pressing downward while further moving the input device 16 in the desired direction of movement.

Figure 4:
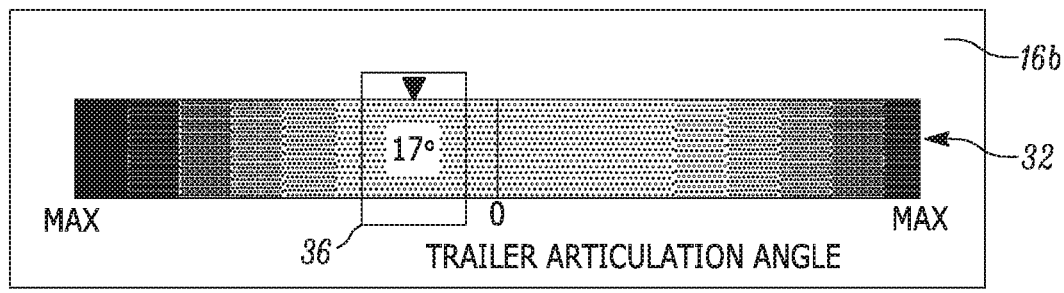
FIG. 4 is a first embodiment of a backing system feedback feature.
Figure 5:
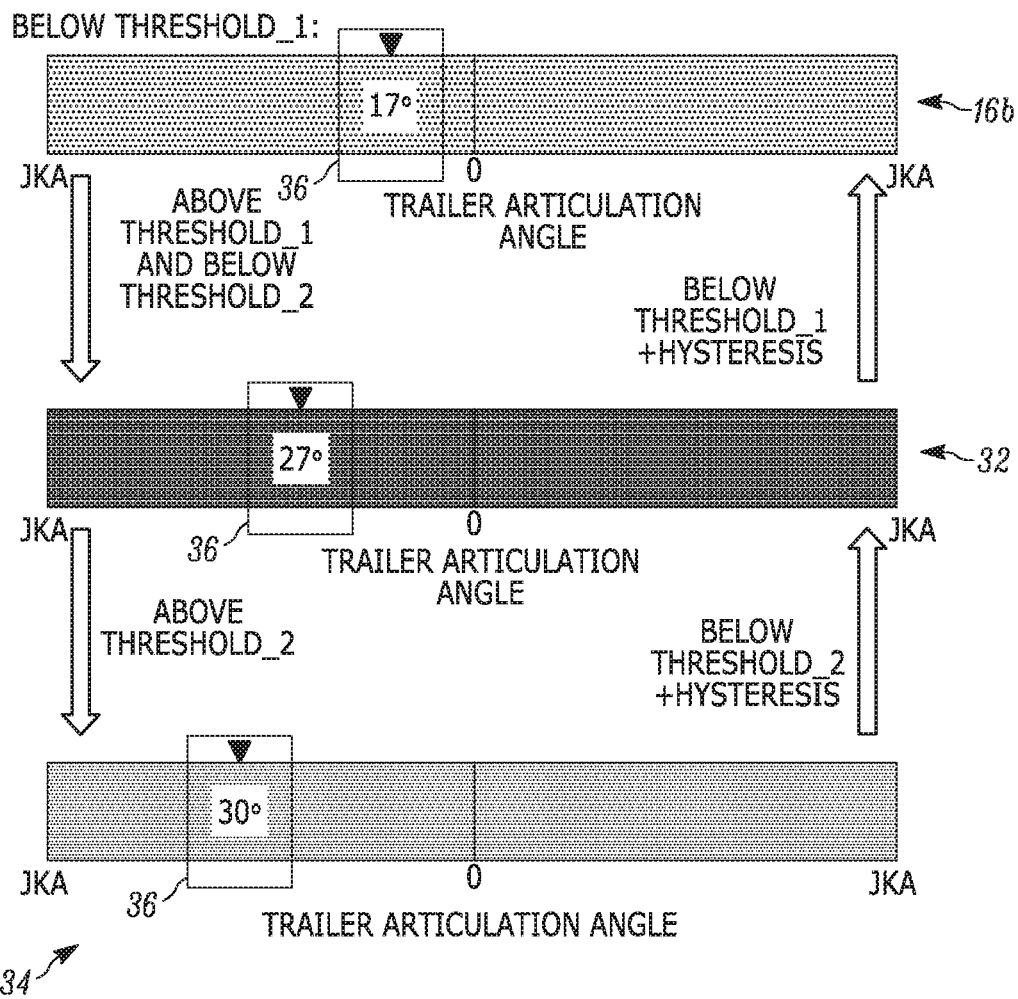
FIG. 5 is a second embodiment of backing system feedback feature.

FIGS. 4 and 5 illustrate multiple embodiments for displaying trailer 11 relative position to the operator. A relative position gage 34 can be shown on a display screen 16b within the vehicle 10. The relative position gage 34 provides a real time visualization of how close the trailer 11 is to its maximum range of motion 32. The relative position gage 34 could be displayed in the center stack or in the instrument cluster. It could provide the operator with trailer information in many formats, including a slider gage 36, color indications, or a "cartoon" image of the vehicle and trailer assembly to help visualize the trailer angle. Additionally the maximum range of motion 32 can be shown on an overlay of the trailer image 11. The overlay may change color to indicate the trailer is getting closer. Or a slider gage shown as an overlay as well. The relative position gage 34 could be combined with haptic and audible feedback. The slider gage 36 may display the relative position of the trailer in real-time.

In FIG. 4 the relative position gage 34 displays a gradient. The gradient relates to how close the relative position in to the allowed relative position. The gradient may be set by the backing system based on the current trailer 11 and the operator proficiency setting.

In FIG. 5 the relative position gage 134 displays a solid color which changes, illustrated by arrows, depending on the how close the relative position in to the allowed relative position. The point at which the colors of the relative position gage 134 will change may be set by the backing system based on the current trailer 11 and the operator proficiency setting.

Figure 6:
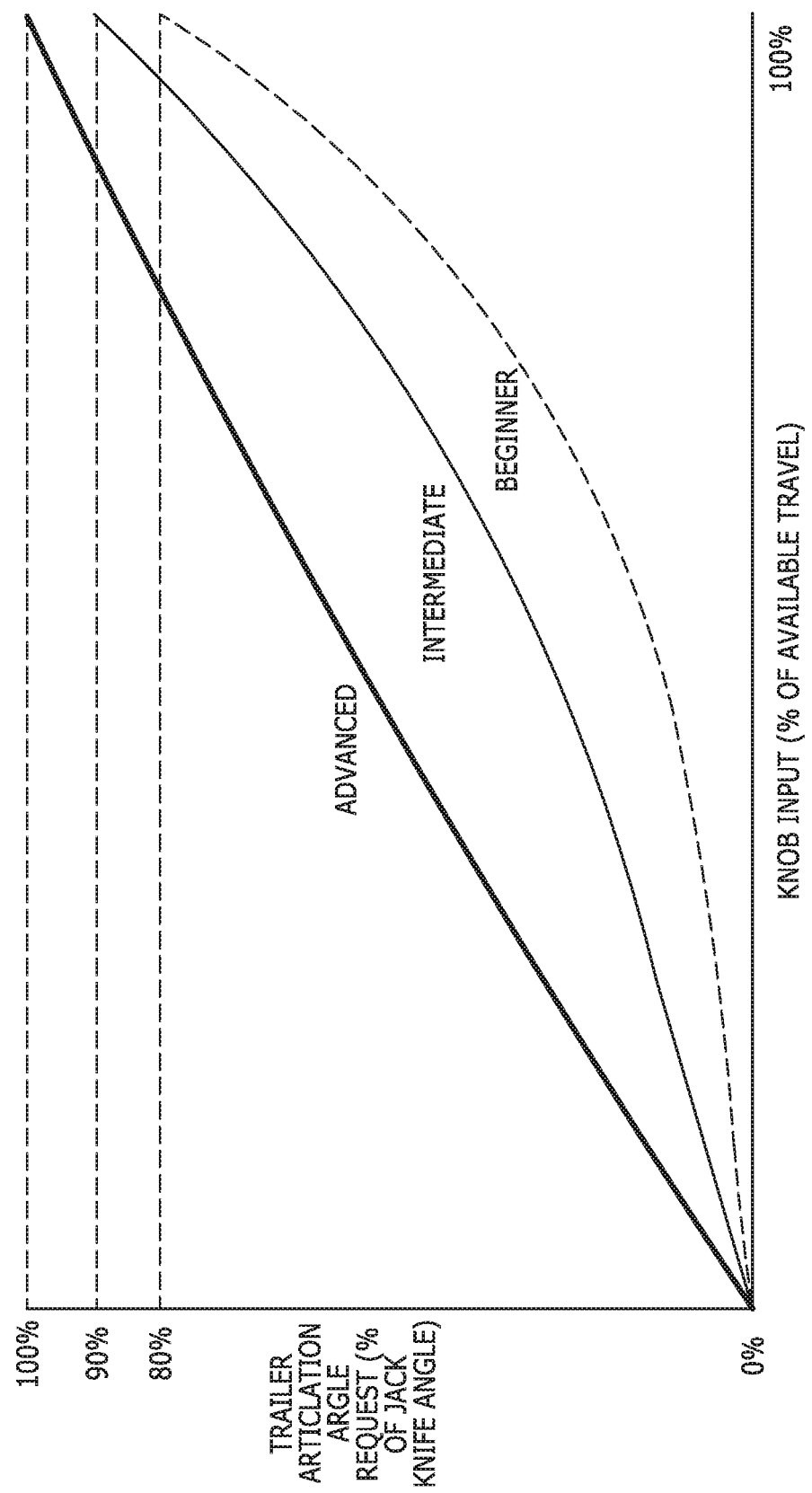
FIG. 6 is a graphical representation of a plurality of operating modes for the backing system.

In another embodiment, as illustrated in FIG. 6, the backing system 14 may have user selectable operator proficiency modes to allow the operator to select how the backing system 14 operates. They can select modes to bias the backing system 14 performance towards comfort or control based on the experience of the operator. The modes may be selected by the input device 16 or through other HMI available in the vehicle 10.

For example, a beginner mode may limit vehicle speed, e.g. 5 kph, when the backing system is operating, a jack-knife protection feature can limit the relative position to a percentage of the jackknife angle, e.g. 80%, a steering angle request based on the input device may be non-linear allowing greater movement of the input device 16 relative to steering control request.

An intermediate mode could be the default setting. In an intermediate mode the backing system 14 may limit vehicle speed, e.g. 8 kph, when the backing system 14 is operating, a jack-knife protection feature can limit the relative position 40 to a percentage of the jackknife angle, e.g. 90%, a steering control request based on the input device 16 may still be non-linear but movement relative to steering angle request would be closer.

Finally, in an advanced mode may limit vehicle speed, e.g. 10 kph, during when operating the backing system 14, a jack-knife protection feature can limit the relative position to a percentage of the jackknife angle, e.g. 98% 100% and if limited may be able to override, a steering control request based on the relative position request may be linear allowing finer control of the trailer 11.

In such a scenario, as illustrated in FIG. 6 the beginner mode prioritizes the comfort of the operator and the advanced mode priorities the control by the operator.

Figure 7:
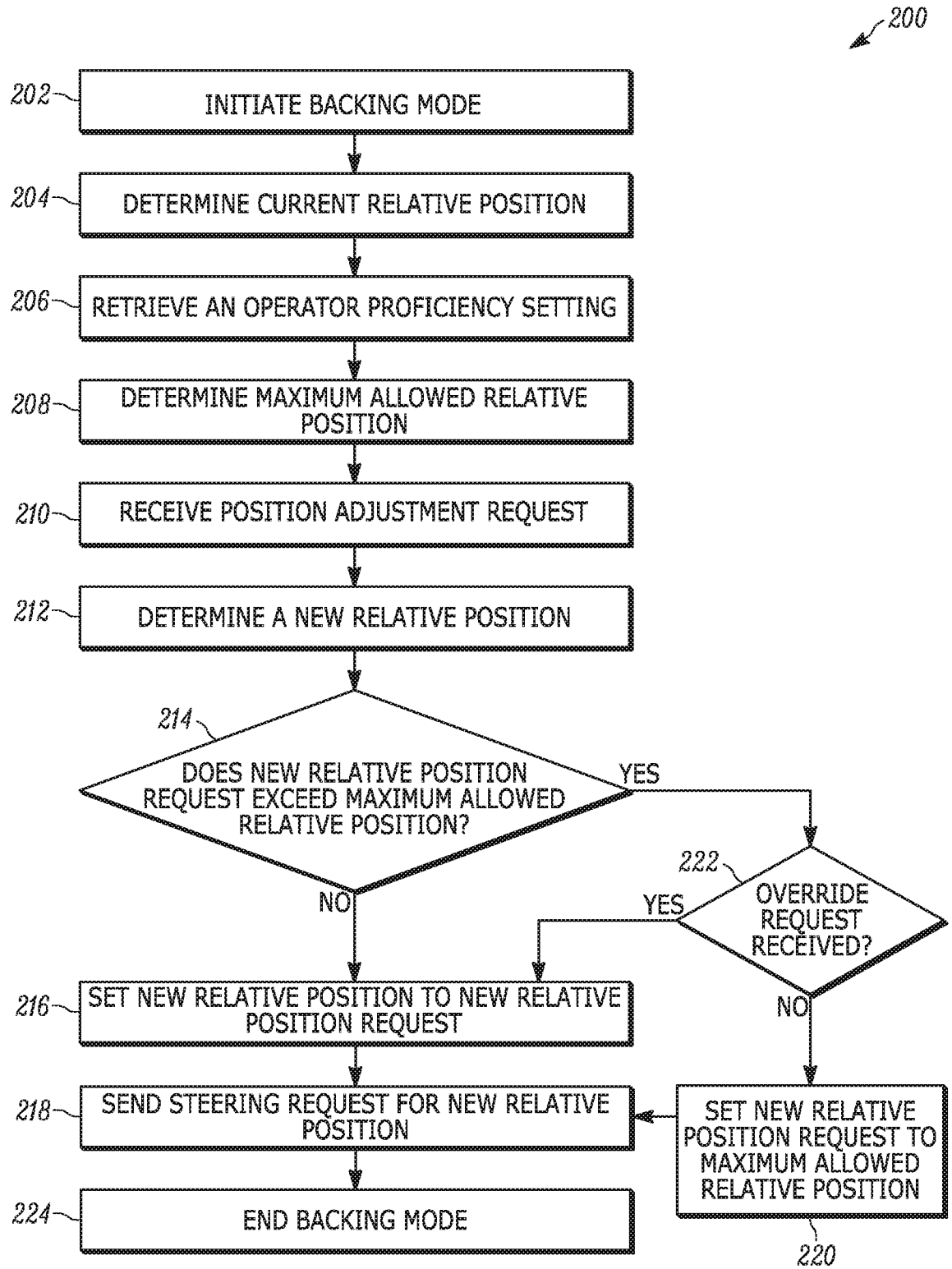
FIG. 7 is an embodiment of a method for using the backing system.

FIG. 7 illustrates, a method of controlling the backing system 14, shown at 200. The method begins by initiating a backing system mode with the ECU for a backing system when a start system input is received. The input could be user activation of the backing system 14 through the input device 16, or other HMI available on the vehicle 10. Alternately, the system could be automatically started when present conditions are met, e.g. vehicle is shifted into reverse when a trailer is attached. Recognition of trailer attachment could come from the ECU 22 or another system, e.g. brake system sends a signal when trailer brakes are attached.

A current relative position representing a relative angle between the vehicle and the trailer is determined with the ECU 22, shown at 204. An operator proficiency setting of the backing system previously selected by an operator is retrieved from memory connected to the ECU 22, shown at 206. A maximum allowable relevant position setting for the current trailer based is determined on the selected operator proficiency setting and the current trailer calibration data, shown at 208. A position adjustment request is entered via the input device 16 and received by the backing system 14, shown at 210. A new relative position is determined based upon the position adjustment request to the input device and the selected operator proficiency setting, shown at 212. The new relative position is compared to the maximum allowed relative position setting for the selected operator proficiency setting to determine if the new relative position is below the maximum allowed relative position setting, shown at 214. The maximum allowed relative position is the relative position which corresponds to the maximum of the allowed range of motion 30.

A new relative position is set to the new relative position request when the new relative position request is within the maximum allowed relative position setting, shown at 216 and then a request is sent to a steering system 24b to provide a steering control for the new relative position, shown at 218. If the new relative position exceeds the maximum allowed relative position setting then new request is set to the maximum allowed relative position setting, shown at 220.

Alternatively, a driver may provide an in input regarding an override intention, whereby the new relative position will be se that the new relative position request regards of whether is exceeds the maximum allowed relative position setting, shown at 222.

Backing mode is ended when the maneuvers are complete, e.g. operator shifts out of reverse, shown at 224.

Other embodiments of this aspect include corresponding computer systems, apparatus, and computer programs recorded on one or more computer storage devices, each configured to perform the actions of the methods.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of maneuvering a vehicle and a trailer assembly in reverse travel with a backing system, the method comprising:
   initiating a backing mode for the backing system;
   determining a current hitch angle between the vehicle and the trailer with an electronic control unit;
   retrieving an operator proficiency setting of the backing system, the operator proficiency setting indicative of a performance mode of the backing system;
   determining a maximum hitch angle setting for the trailer based on the operator proficiency setting and a current trailer calibration data;
   receiving a position adjustment request via an input device;
   determining a new hitch angle based upon the position adjustment request and the operator proficiency setting;
   comparing the new hitch angle to the maximum hitch angle setting for the operator proficiency setting to determine if the new hitch angle is below the maximum hitch angle setting; and
   sending a request to a steering system to provide a steering control for the new hitch angle when the new hitch angle is within the maximum hitch angle setting.

2. The method of claim 1, wherein further comprising setting the new hitch angle to the maximum hitch angle setting when the new hitch angle exceeds the maximum hitch angle setting.

3. The method of claim 1, further comprising determining the operator proficiency setting by determining a maximum vehicle speed setting and a steering adjustment setting for the trailer.

4. The method of claim 1, further comprising determining the operator proficiency setting by receiving a selection from an operation of one of a beginner mode, an intermediate mode, or an advanced mode.

5. The method of claim 4, wherein during the beginner mode, the maximum hitch angle setting equals a first percentage of a jackknife angle.

6. The method of claim 5, wherein during the intermediate mode, the maximum hitch angle setting equals a second percentage of the jackknife angle, the second percentage is greater than the first percentage.

7. The method of claim 5, wherein during the advanced mode, the maximum hitch angle setting equals a third percentage of the jackknife angle, the third percentage greater than the first percentage.

8. The method of claim 1, further comprising setting the new hitch angle to be greater than the maximum hitch angle setting when the new hitch angle exceeds the maximum hitch angle setting and an override request is received from the input device.

9. The method of claim 8, wherein the input device is a knob and the override request is a downward pressure on the knob sufficient to move the knob in a downward direction.

10. The method of claim 1, wherein the new hitch angle is determined with the electronic control unit based on an allowed range of motion that limits the new hitch angle to the maximum hitch angle setting to prevent jack-knifing of the vehicle and the trailer assembly.

11. The method of claim 1, wherein the new hitch angle is calculated in real time with inputs received by the electronic control unit and a camera.

12. The method of claim 1, wherein the electronic control unit has a display screen configured to be a human machine interface capable of receiving input requests from a user.

13. The method of claim 1, further comprising:
   instructing a display screen to display a position gage including the maximum hitch angle setting and the current hitch angle or the new hitch angle in real-time.

14. The method of claim 1, further comprising causing, in real time, a display associated with the vehicle to display the hitch angle between the vehicle and the trailer and the maximum hitch angle setting for the current trailer.

15. The method of claim 14, wherein causing the display of the hitch angle between the vehicle and the trailer and the maximum hitch angle setting for the current trailer comprises causing the display of the hitch angle between the vehicle and the trailer and the maximum hitch angle setting for the current trailer as part of a gauge having at lengthwise end portions of the gauge the maximum hitch angle setting for the current trailer, and an indication along the gauge of the hitch angle between the vehicle and the trailer.

16. The method of claim 15, wherein the gauge includes a sliding frame along the gauge in which the hitch angle between the vehicle and the trailer is disposed.

17. The method of claim 15, wherein at least a portion of the gauge changes color as the hitch angle between the vehicle and the trailer approaches the maximum hitch angle setting for the current trailer.

18. The computer software product of claim 14, wherein the method further comprises setting the new hitch angle to be greater than the maximum hitch angle setting when the new hitch angle exceeds the maximum hitch angle setting and an override request is received from the input device.

19. The computer software product of claim 14, wherein determining the new hitch angle with the electronic control unit is based on an allowed range of motion that limits the new hitch angle to the maximum hitch angle setting to prevent jack-knifing of the vehicle and the trailer assembly.

20. The computer software product of claim 14, wherein the electronics controller, when executing the instructions causes in real time, a display associated with the vehicle to display the hitch angle between the vehicle and the trailer and the maximum hitch angle setting for the current trailer, wherein causing the display of the hitch angle between the vehicle and the trailer and the maximum hitch angle setting for the current trailer comprises causing the display of the hitch angle between the vehicle and the trailer and the maximum hitch angle setting for the current trailer as part of a gauge having at lengthwise end portions of the gauge the maximum hitch angle setting for the current trailer, and an indication along the gauge of the hitch angle between the vehicle and the trailer.

21. A computer program product stored in non-transitory memory having instructions which when executed by an electronics controller, causes the electronics controller to perform a method for maneuvering a vehicle and a trailer assembly in reverse travel with a trailer backing system comprising:
   initiating a backing mode for the backing system;
   determining a current hitch angle between the vehicle and the trailer with an electronic control unit;
   retrieving an operator proficiency setting of the backing system, the operator proficiency setting indicative of a performance mode of the backing system;
   determining a maximum hitch angle setting for the trailer based on the operator proficiency setting and a current trailer calibration data;
   receiving a position adjustment request via an input device;
   determining a new hitch angle based upon the position adjustment request and the operator proficiency setting;
   comparing the new hitch angle to the maximum hitch angle setting for the operator proficiency setting to determine if the new hitch angle is below the maximum hitch angle setting; and
   sending a request to a steering system to provide a steering control for the new hitch angle when the new hitch angle is within the maximum hitch angle setting.

22. A trailer backing system for a vehicle having a trailer connected thereto, the system comprising:
   an electronic controller;
   non-transitory memory coupled to the electronic control unit, the non-transitory memory storing a program having instructions which, when retrieved by the electronic controller at a first input terminal thereof and executed by the electronic controller, results in the electronic controller performing a method comprising
   initiating a backing mode for the backing system;
   determining a current hitch angle between the vehicle and the trailer with an electronic control unit;
   retrieving an operator proficiency setting of the backing system, the operator proficiency setting indicative of a performance mode of the backing system;
   determining a maximum hitch angle setting for the trailer based on the operator proficiency setting and a current trailer calibration data;
   receiving a position adjustment request via an input device;
   determining a new hitch angle based upon the position adjustment request and the operator proficiency setting;
   comparing the new hitch angle to the maximum hitch angle setting for the operator proficiency setting to determine if the new hitch angle is below the maximum hitch angle setting; and
   sending a request to a steering system to provide a steering control for the new hitch angle when the new hitch angle is within the maximum hitch angle setting.

23. The trailer backing system of claim 22, wherein the method further comprises setting the new hitch angle to the maximum hitch angle setting when the new hitch angle exceeds the maximum hitch angle setting, and setting the new hitch angle to be greater than the maximum hitch angle setting when the new hitch angle exceeds the maximum hitch angle setting and an override request is received from the input device.

* * * * *